United States Patent
Zhang et al.

(10) Patent No.: US 12,548,572 B2
(45) Date of Patent: Feb. 10, 2026

(54) SYSTEMS AND METHODS FOR ADAPTIVE PREPROCESSOR SELECTION FOR EFFICIENT MULTI-MODAL CLASSIFICATION

(71) Applicant: Capital One Services, LLC, McLean, VA (US)

(72) Inventors: Rui Zhang, New York, NY (US); Dustin Summers, Lovettsville, VA (US); Sandeep K. Gadde, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 167 days.

(21) Appl. No.: 18/516,500

(22) Filed: Nov. 21, 2023

(65) Prior Publication Data
US 2024/0386897 A1   Nov. 21, 2024

Related U.S. Application Data

(60) Provisional application No. 63/503,459, filed on May 19, 2023.

(51) Int. Cl.
*G10L 15/34* (2013.01)
*G10L 25/06* (2013.01)

(52) U.S. Cl.
CPC ............. *G10L 15/34* (2013.01); *G10L 25/06* (2013.01)

(58) Field of Classification Search
None
See application file for complete search history.

(56) References Cited

U.S. PATENT DOCUMENTS

| | | |
|---|---|---|
| 2017/0262986 A1* | 9/2017 | Xiong ............... G06T 7/521 |
| 2020/0293394 A1* | 9/2020 | Abhinav ............ G06T 7/0004 |
| 2021/0082398 A1* | 3/2021 | Hori ................. G06N 3/044 |
| 2022/0309295 A1* | 9/2022 | Wang ................ G06T 7/0012 |
| 2024/0354317 A1* | 10/2024 | Fayyaz .............. G06F 16/313 |
| 2024/0378396 A1* | 11/2024 | Bhupati ............. G06F 40/20 |
| 2024/0412515 A1* | 12/2024 | Yao .................. G06V 10/82 |

* cited by examiner

*Primary Examiner* — Douglas Godbold
(74) *Attorney, Agent, or Firm* — Foley & Lardner LLP

(57) ABSTRACT

Methods and systems are described herein for minimizing the computational and/or storage cost of computer resources when analyzing multi-modal data. A system may receive a multi-modal input using one or more sensors. The system inputs the multi-modal input into a first preprocessor to generate a first output of a single modal data format. The system then inputs the first output into an artificial intelligence (AI) model trained to determine classifications of inputted data and confidence measures for each classification. The output from the AI model indicates a first classification and a first confidence measure for the first classification. In response to determining that the first confidence measure does not correspond to a threshold confidence measure, the system selects a second preprocessor having a greater computational cost than the first preprocessor. Then the system may input the multi-modal input into the second preprocessor to generate a second output.

21 Claims, 5 Drawing Sheets

SYSTEMS AND METHODS FOR ADAPTIVE PREPROCESSOR SELECTION FOR EFFICIENT MULTI-MODAL CLASSIFICATION

CROSS-REFERENCE TO RELATED APPLICATION(S)

This application claims the benefit of priority of U.S. Provisional Application No. 63/503,459, filed May 19, 2023. The content of the foregoing application is incorporated herein in its entirety by reference.

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations.

However, despite these benefits and the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results.

These technical problems present an inherent problem with attempting to use an artificial intelligence-based solution in classifying multi-modal data (e.g., data of different modalities), e.g., as non-sensitive and/or sensitive data (e.g., personal identification information, financial account information, employment information, etc.). For example, while artificial intelligence models may increasingly become more sophisticated through the use of more in-depth training to detect, more precisely and more accurately, even the remotest of patterns, these artificial intelligence models require more time, processing power, and/or computer resources to perform these tasks. Applying such high levels of processing for tasks that require dynamic levels of artificial intelligence can lead to inefficiencies such as excess energy expenditure, excess time spent that could be performed on other tasks, and/or the like.

SUMMARY

Methods and systems are described herein for novel uses and/or improvements to artificial intelligence applications. As one example, methods and systems are described herein for minimizing the computational cost and/or storage cost of computer resources when analyzing multi-modal data, e.g., to classify sensitive information in multi-modal inputs.

Existing systems fail to process multi-modal data in real-time and/or in cases where limited processing capability is available (e.g., such as in mobile devices). For example, existing systems cause significant computational and/or storage cost during preprocessing and/or provide inaccurate results due to low-quality data, or inadequately using artificial intelligence models processed data that is noisy, inconsistent, missing, etc. In particular, classifying multi-modal data using artificial intelligence-based solutions (e.g., as sensitive or non-sensitive data) can be difficult because multi-modal data includes different data formats (e.g., auditory, visual, textual, etc.). Conventional systems typically use distinctly trained models for processing each of the different modalities, or for different combinations of modalities, which may be computationally expensive to train and apply for classifying data. Furthermore, the artificial intelligence models may not be able to accurately classify multi-modal data because the data may be noisy, inconsistent, missing, etc., and therefore difficult to use in training and/or applying artificial intelligence models for predictions and classifications.

However, the difficulty in adapting artificial intelligence models for this practical benefit faces several technical challenges as the different data formats (e.g., textual, auditory, visual, etc.) may thus require advanced processing (e.g., optical character recognition (OCR), automatic speech recognition (ASR), etc.) using preprocessors of different types and with different processing algorithms. However, performing the same level of advanced processing on every input may be computationally costly and/or storage costly and prevent multi-modal data from being processed in real-time and/or in devices with limited processing capability (e.g., mobile devices).

To overcome these technical deficiencies in adapting artificial intelligence models for this practical benefit, methods and systems disclosed herein triage preprocessors that perform the multi-modal data analysis. For example, methods and systems disclosed herein include selecting an advanced preprocessor from a plurality of preprocessors based on an output of a classification using the output of an initial preprocessor not corresponding to a threshold confidence measure (e.g., the methods and systems may assume reliable confidence measures that can be provided by modern calibration methods). Accordingly, the methods and systems provide conservation of computational cost, e.g., for use only in instances where the multi-modal data analysis is particularly difficult or complex.

While artificial intelligence models may increasingly become more sophisticated through the use of comprehensive training for detection or classification in nuanced problems or inputs, such artificial intelligence models also necessitate more processing time, processing power, and/or computer resources to perform these tasks. The system may minimize the computational cost and/or storage cost by only devoting particular computer resources to initial classifications. The system may likewise determine a confidence measure in these confidences. While devoting additional resources to this extra determination (e.g., in the already computationally costly and/or storage costly computing environment) may seem counterintuitive by further utilizing the existing computer resources, this additional determination allows the system to triage the computer resources and reallocate them to provide an overall reduction on the computational cost and/or storage cost. That is, depending on the overcome of the initial classification and its respective confidence measure, the system may devote more complex computer resources in instances of low confidences. By doing so, the more complex computer resources are only engaged as required.

In some aspects, a system may minimize the computational cost and/or storage cost of computer resources when analyzing multi-modal data. The system may receive a multi-modal input using one or more sensors, wherein the multi-modal input comprises a multi-modal data format. The system may input the multi-modal input into a first preprocessor to generate a first output. The first output may comprise a single modal data format, and the first preprocessor may have a first computational cost (e.g., a lower computational cost as compared to other available preprocessors). The system may then input the first output into an artificial intelligence model, wherein the artificial intelligence model is trained to determine classifications of inputted data and determine confidence measures for each respective classification. The system may receive a first model output from the artificial intelligence model, e.g., indicating a first classification for the first model output and a first confidence measure for the first classification, and may then compare the first confidence measure to a threshold confidence measure. In response to determining that the first confidence measure does not correspond to the threshold confidence measure, the system may select a second preprocessor from a plurality of preprocessors based on the second preprocessor having a greater computational cost than the first preprocessor. The system may input the multi-modal input into the second preprocessor to generate a second output, wherein the second output comprises the single modal data format (e.g., textual, auditory, visual, kinesthetic, etc.). A recommendation based on the second output can be generated for display, such as on a user interface.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
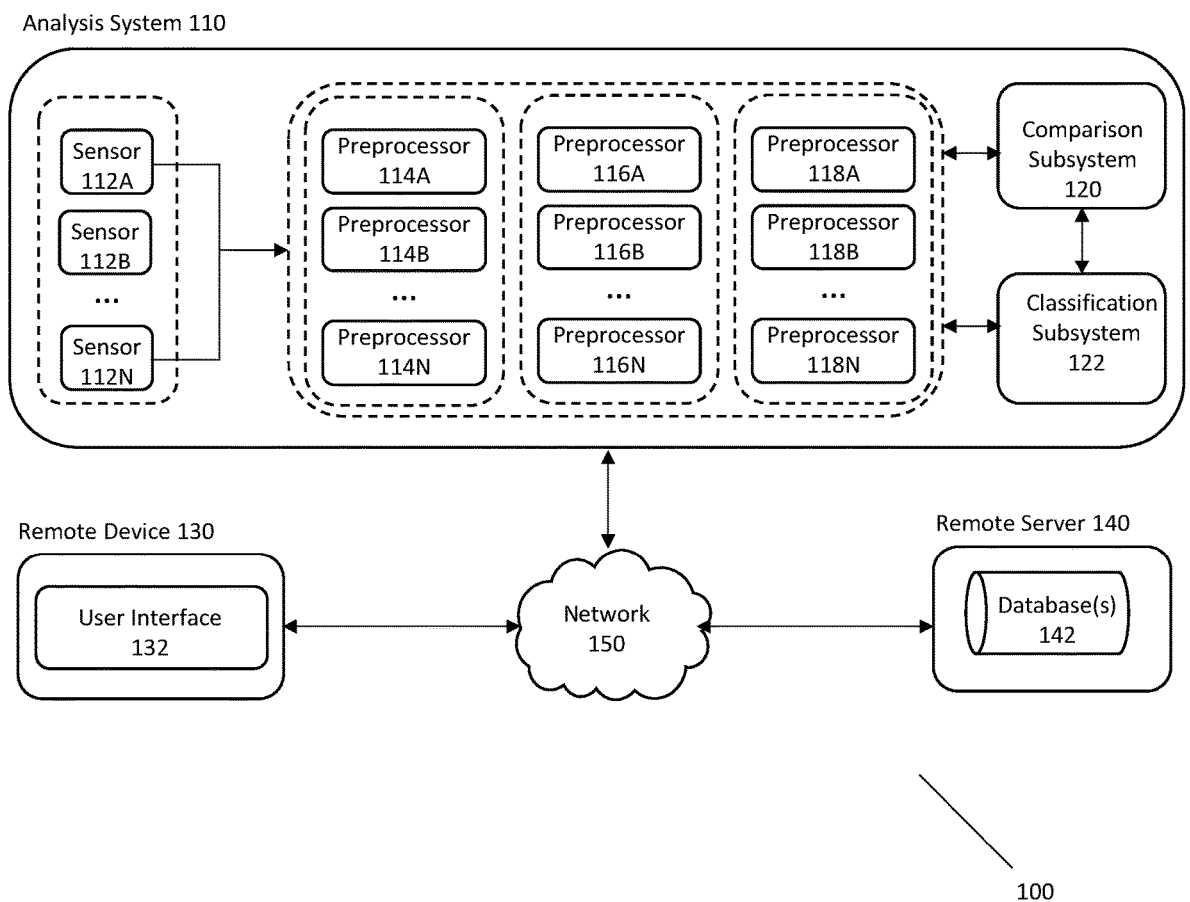
FIG. 1A shows an illustrative diagram of a system for the computational cost and/or storage cost of computer resources when analyzing multi-modal data, in accordance with one or more embodiments.

FIG. 1A is an example of environment 100 for the computational cost and/or storage cost of preprocessors, such as in mobile devices, when analyzing multi-modal data for sensitive data in real-time, in accordance with one or more embodiments. Environment 100 includes analysis system 110, remote device 130, remote server 140, and network 150. Analysis system 110, remote device 130, and remote server 140 may be in communication via the network 150. Network 150 may be a wired or wireless connection such as via a local area network, a wide area network (e.g., the Internet), or a combination thereof. The analysis system 110 may be used to minimize the computational cost and/or storage cost of preprocessors.

Analysis system 110 may receive a multi-modal input using one or more sensors 112A-N. As referred to herein, a multi-modal input may include a multi-modal data format. A multi-modal input may include multiple types of input or data having different formats. For example, a multi-modal input may include auditory information with auditory formats (e.g., MPEG audio layer 3 (MP3), waveform audio file format (WAV), audio interchange file format (AIFF), mono, stereo, ambisonics, etc.), textual information with textual formats (e.g., TXT, DOC, portable document format (PDF), rich text format (RTF), Unicode, etc.), and/or visual information with visual formats (e.g., joint photographic experts group (JPEG), portable networks graphic (PNG), tagged image file format (TIFF), etc.).

Sensors 112A-N may include any combination of sensors such as imaging sensors (e.g., camera), sound sensors (e.g., microphones, etc.), temperature sensors, pressure sensors, motion sensors, light sensors, etc. to receive multi-modal inputs. Sensors 112A-N may be capable of capturing multi-modal inputs, e.g., of any formats described herein. Alternatively, or additionally, analysis system 110 may receive the multi-modal input from another device (e.g., remote device 130, remote server 140, database 142 of a remote server 140, etc.) via the network 150, for example, in response to requesting the input from the other device. In some examples, the input may be stored locally at the analysis system 110 and retrieved at a later time.

The analysis system 110 may then input the multi-modal input into a preprocessor such as preprocessors 114A-N, preprocessors 116A-N, and preprocessors 118A-N. Each set of preprocessors 114A-N, 116A-N, and 118A-N may be configured to preprocess data of different modalities. Preprocessors 114A-N may be configured to perform preprocessing for data of an auditory modality. For example, the preprocessors 114A-N may be configured to perform noise reduction, automatic speech recognition (ASR), filtering, feature extraction, segmentation, and/or normalization. Preprocessors 116A-N may be configured to perform preprocessing for data of a textual modality. For example, the preprocessors 116A-N may be configured to perform tokenization, lowercasing, removing punctuation, removing stop words stemming, and/or lemmatization. Preprocessors 118A-N may be configured to perform preprocessing for data of a visual modality. For example, the preprocessors 118A-N may be configured to perform OCR, resizing, cropping, color space conversion, normalization, noise reduction, augmentation, etc.

The preprocessors of analysis system 110 may also be of varying computational cost. For example, preprocessor 114A may have a greater computational cost than preprocessor 114B, which may have a greater computational cost than preprocessor 114N. For example, as described herein, the preprocessors 114A-N may be configured to perform preprocessing for data of an auditory modality, and preprocessor 114A may be capable of performing more advanced and/or complex preprocessing which is more computationally expensive than preprocessor 114B. Several factors may affect a preprocessor's computational cost. For example, the type and speed of preprocessor, the amount of memory available, the efficiency of the software, specialized hardware/software (e.g., graphics processing units (GPUs)), or parallel processing algorithms. In other examples, certain preprocessors may be configured to perform more preprocessing functions.

As described herein, the analysis system 110 may then input the multi-modal input into an initial preprocessor, e.g., prior to inputting it into an artificial intelligence (AI) model to classify the multi-modal input (e.g., as sensitive, or non-sensitive). The analysis system 110 may determine a modality included in the multi-modal input and in response to determining that the multi-modal input includes data of a modality, the system may select a preprocessor configured to perform preprocessing functions for that modality.

For example, in response to determining that the multi-modal input comprises data with the auditory modality, the analysis system 110 may select a preprocessor based on the preprocessor being configured to perform ASR. As another example, the analysis system 110 may, in response to determining that the multi-modal input comprises data with the visual modality, select a preprocessor based on the preprocessor being configured to perform OCR. Alternatively, or additionally, the analysis system 110 may, in response to determining that the multi-modal input comprises data with textual modality, select a preprocessor based on the preprocessor being configured to perform preprocessing functions for textual data, e.g., at least one of tokenization, lowercasing, stemming, or lemmatization.

The analysis system 110 may input the multi-modal input into the preprocessor to generate an output. The output may include a single modal data format (e.g., text data). For example, the analysis system 110 may obtain data including both auditory and textual modalities of auditory and textual data formats. The system may then determine the modalities of the input and select the preprocessor 114N and preprocessor 116N based on preprocessor 114N being configured to perform ASR and preprocessing functions for text data, respectively. The analysis system 110 may then input the input into the selected preprocessors, preprocessor 114N and preprocessor 116N. As a result of ASR, the preprocessor 114N may output data of a textual modality. The preprocessor 116N may also output data of a textual modality.

Additionally, or alternatively, the analysis system 110 may select the initial preprocessors based on the initial preprocessors having a lower computational cost, e.g., relative to the other preprocessors of the analysis system 110. For example, the analysis system 110 may select preprocessors in order of increasing computational cost. By doing so, the system may conserve computational cost, e.g., for use only in instances where the multi-modal data analysis is particularly difficult or complex such that computational resources are not used in an inefficient manner. For example, rather than using advanced preprocessors in the first iteration of classifying the multi-modal data, the system may use an initial preprocessor having a lower computational cost. If the confidence for the classification is too low, the system may then use a more advanced preprocessor.

The output of the preprocessors (e.g., preprocessed data) may be input into a model to classify the data. For example, the analysis system 110 may input the output (e.g., text data) into an AI model of classification subsystem 122. The AI model of classification subsystem 122 may be trained to determine classifications of inputted data and determine confidence measures for each respective classification. For example, the AI model may be trained to determine classifications of sensitive and non-sensitive data. As referred to herein, sensitive data may refer to information that is private or confidential and requires special handling to protect it from unauthorized access or disclosure. Sensitive data may include personal information such as social security numbers, financial data (e.g., account numbers and passwords), medical records, and login credentials. In some examples, the AI model may be trained on a single modal data format, such as data of a textual modality. By doing so, the system may train just one model rather than separate models for different modalities and conserve computational processing power. Alternatively or additionally, the AI model may be trained to determine classifications such as sentiment classification, language detection, spam detection, handwriting recognition, customer segmentation, and/or the like.

The analysis system 110 may receive a model output from the AI model of the classification subsystem 122. The model output may indicate a classification for the model output and a confidence measure for the classification. As referred to herein, the confidence measure may be a numerical value representing a level of confidence or certainty in the classification, e.g., a quantification of the reliability or accuracy of the classification. As described herein, the classification may be a classification for whether or not the data includes sensitive data.

The classification subsystem 122 may pass at least a portion of the data included in model output to the analysis system 110 and/or to the comparison subsystem 120. The comparison subsystem 120 may compare the confidence measure to a threshold confidence measure. As referenced herein, a threshold confidence may be a threshold for a confidence measure based on which the analysis system may decide to perform additional actions. In some examples, the threshold confidence may be a threshold for a confidence measure for a classification of whether or not the data includes sensitive data. The threshold value may be predetermined, e.g., set by a user or other entity, determined by the analysis system 110 dynamically based on the input, etc.

In some examples, the analysis system 110 may determine that the confidence measure does correspond to the threshold confidence measure. As referred to herein, a confidence measure that corresponds to the threshold confidence measure may refer to a confidence measure that meets or exceed a threshold value. The analysis system 110 may then make recommendations (e.g., to a user via the display 132) based on the determined classification. For example, if the multi-modal input was classified to contain sensitive data, the analysis system 110 may provide recommendations for obfuscating at least a portion of the multi-modal input, e.g., by redacting the portion of the multi-modal input.

In some examples, the analysis system 110 may determine that the confidence measure does not correspond to the threshold confidence measure. As referred to herein, a confidence measure that does not correspond to the threshold confidence measure may refer to a confidence measure that does not meet or exceed a threshold value. In response to determining that the confidence measure does not correspond to the threshold confidence measure, the analysis system 110 may select another preprocessor, for example, based on the second preprocessor having a greater computational cost than the first preprocessor. Alternatively, or additionally, the second preprocessor(s) may be determined based on memory cost of the preprocessor(s). For example, the analysis system 110 may determine a respective memory cost for each preprocessor and select the second preprocessor based on its respective memory cost.

In the example of FIG. 1A, the analysis system 110 may select the preprocessor 114N and preprocessor 116N initially based on a determination that the multi-modal data includes auditory and textual data. The preprocessors may perform preprocessing such as ASR to output data of a single modal data format, e.g., textual format such as TXT, DOC, ascii, etc. The single modal data format output may then be input into the classification subsystem 122. The classification subsystem 122 may output a classification, e.g., sensitive data, and a confidence measure. If the confidence measure is less than a threshold confidence measure, the system may select preprocessors, such as preprocessor 114B and preprocessor 116B having greater computational cost than the initially selected preprocessors, such as preprocessor 114N and preprocessor 116N.

The analysis system 110 may then input the multi-modal input into the second preprocessor(s) (e.g., of greater computational cost) to generate a second output. Analysis system 110 may select the second preprocessor in various different ways. For example, the second preprocessor may be a preprocessor having the next greater computational cost and/or the next greater computational expense than the first preprocessor used. For example, assuming preprocessors $P_1, P_2, \ldots P_n$ are of increasing computational cost, and given that the first preprocessor used was $P_k$, the next preprocessor selected may be $P_k \pm 1$. In alternative examples, analysis system 110 may use previously observed inputs and corresponding preprocessors to determine a suitable preprocessor as described herein, e.g., using k-means clustering and/or hash tables.

In some examples, the second output comprises the single modal data format. The preprocessed data may then be input into the AI model of classification subsystem 122. As described herein, the analysis system 110 may receive a model output from the AI model indicating a second classification for the multi-modal input and a second confidence measure for the second classification. The system may compare the second confidence measure to the threshold confidence measure and determine that the second confidence measure corresponds to the threshold confidence measure (e.g., exceeds the threshold). In response to determining that the second confidence measure corresponds to the threshold confidence measure, the system may generate one or more recommendations and determine to generate the recommendation(s) for display.

According to some examples, and as described herein, analysis system 110 may select the first and/or second preprocessor using previous data collected. For example, to select the second preprocessor, analysis system 110 may consider previous inputs and a determined corresponding optimal preprocessor. For example, the analysis system may store previous inputs and/or information on characteristics of previous inputs, e.g., quality or characteristics indicative of the quality of the input such as bit rate, sample rate, compression, noise, etc. for audio inputs, and/or resolution, compression, noise, color accuracy, sharpness, and/or artifacts for visual inputs (e.g., images). The analysis system may further store the preprocessor that yielded a confidence measure that corresponded to the threshold confidence measure (e.g., exceeds the threshold). Based on a new input, the system may determine that the input and/or characteristics of the input are similar to and/or the same as a previously observed input. The system may then select the preprocessor that yielded a confidence measure that corresponded to the threshold confidence measure (e.g., exceeds the threshold) for the previous input.

For example, when receiving a new input, the system may find a similar previously observed input. In some examples, the analysis system may compare the new input to previous inputs directly. For example, for auditory inputs, this may include using cross-correlation, dynamic time warping etc. between new and old inputs. For visual inputs, this may include using pixel-by-pixel comparison, structural similarity index, mean squared error, etc. between new and old inputs. For textual inputs, this may include using cosine similarity, Jaccard similarity, Levenshtein distance, etc. between new and old inputs. The system may find a most similar previously observed input as described and determine the preprocessor that yielded a confidence measure that corresponded to the threshold confidence measure (e.g., exceeds the threshold) and is of the least computational expense for that input. The system may then use that preprocessor to perform preprocessing on the input. Furthermore, for each modality, similarity may be calculated using measures such as Euclidean distances between embedding representations of the new and old inputs obtained via representation learning frameworks.

According to some examples, analysis system 110 may select the first and/or second preprocessor using a hash table of one or more previous inputs and the preprocessor that yielded a confidence measure that corresponded to the threshold confidence measure and optionally that involved the lowest computational cost. When a new input is received, the system may determine a first or second preprocessor by finding similar inputs in the hash table (e.g., using approximate string matching, nearest neighbor search, etc.). The system may then determine the corresponding preprocessor and use it to preprocess the input.

Alternatively or additionally, analysis system 110 may select the first and/or second preprocessor using previously collected data through a clustering algorithm, such as k-means (e.g., online k-means), which partitions a set of data points into a number of clusters based on their similarity. An analysis system configured to use k-means is described herein with reference to FIG. 1B. The number of clusters and centers may correspond to the number of preprocessors available. For example, the analysis system may use previous inputs and/or their characteristics as data points and assign a center, wherein each center may be associated with a preprocessor (e.g., the preprocessor used in highest frequency and yielding best results, for example, in terms of accuracy, time, likelihood of false negatives, etc. for inputs in the cluster). The centers may be updated by computing the mean of the inputs assigned to each cluster. When a new input is received, the system may determine which cluster it belongs to by detecting which center the input is closest to (e.g., via distance measurement, etc.) and select the preprocessor associated with the cluster. The system may optionally update the centers using the new input. According to other examples, the analysis system 110 may receive cluster centers and corresponding data from a server, etc. and update the cluster centers incrementally by updating each time a new input (e.g., a new data point) is received.

In some applications, selecting the first and/or second preprocessor using the clustering algorithm may be preferred over selecting the first and/or second preprocessor using a hash table. For example, a hash table may necessitate storing all past data points, where each data point can have a nontrivial memory cost depending on the representation. In applications where large amounts of data are classified, a clustering algorithm may be more scalable as it does not necessitate a continuously growing memory cost as a hash table might. In using hash tables, the system can employ typical cache management by discarding older data points, however, this approach can be indiscriminate as older data can be equally as useful as new data, and the removal of older data could lead to loss of a more representative model. By comparison, a system utilizing online clustering retains data points that are most similar to incoming data overall, without the risk of removing the influence of data points that are possibly important to the overall model.

Similarly, the analysis system 110 may select the first and/or second preprocessor in other ways. For example, alternatively, and/or additionally, analysis system 110 may select the first and/or second preprocessor using reinforcement learning (e.g., value-based reinforcement, policy-based, model-based, etc.). The rewards and/or penalties may be a function of the computational expense of using a preprocessor and the confidence measure. In one example, the reinforcement learning may have a reward function represented as $(1-\text{beta})t+\text{beta}*\text{acc}->(1-\text{beta})*\exp(t)+\text{beta}*\text{acc}$. In some examples, exp represents the exponential density function such as with a lambda value of one where beta is a parameter controlling weighting between two components, the first being t, representing time, and the second being acc, representing an accuracy (e.g., as measured using metrics described herein, or any suitable measurement). In some examples, the rewards may be immediate rewards where the action does not alter the state(s). In some examples, the reward function may be used to normalize and invert the reward trend with respect to a value of t, e.g., as the value of t increases the value of a reward decreases (unlike acc).

Once the first and/or second preprocessors are selected (e.g., using the above-mentioned techniques), the preprocessors may perform preprocessing (e.g., ASR) to output data of a single modal data format. The single modal data format output may then be input into the classification subsystem 122 which may subsequently output a classification. As described herein, the classification may include a classification indicating whether the data comprises sensitive data. Recommendations to the user may be made based on the classification. For example, as described herein, the recommendations may be a recommendation for obfuscating at least a portion of the multi-modal input by redacting the portion of the multi-modal input.

Figure 2:
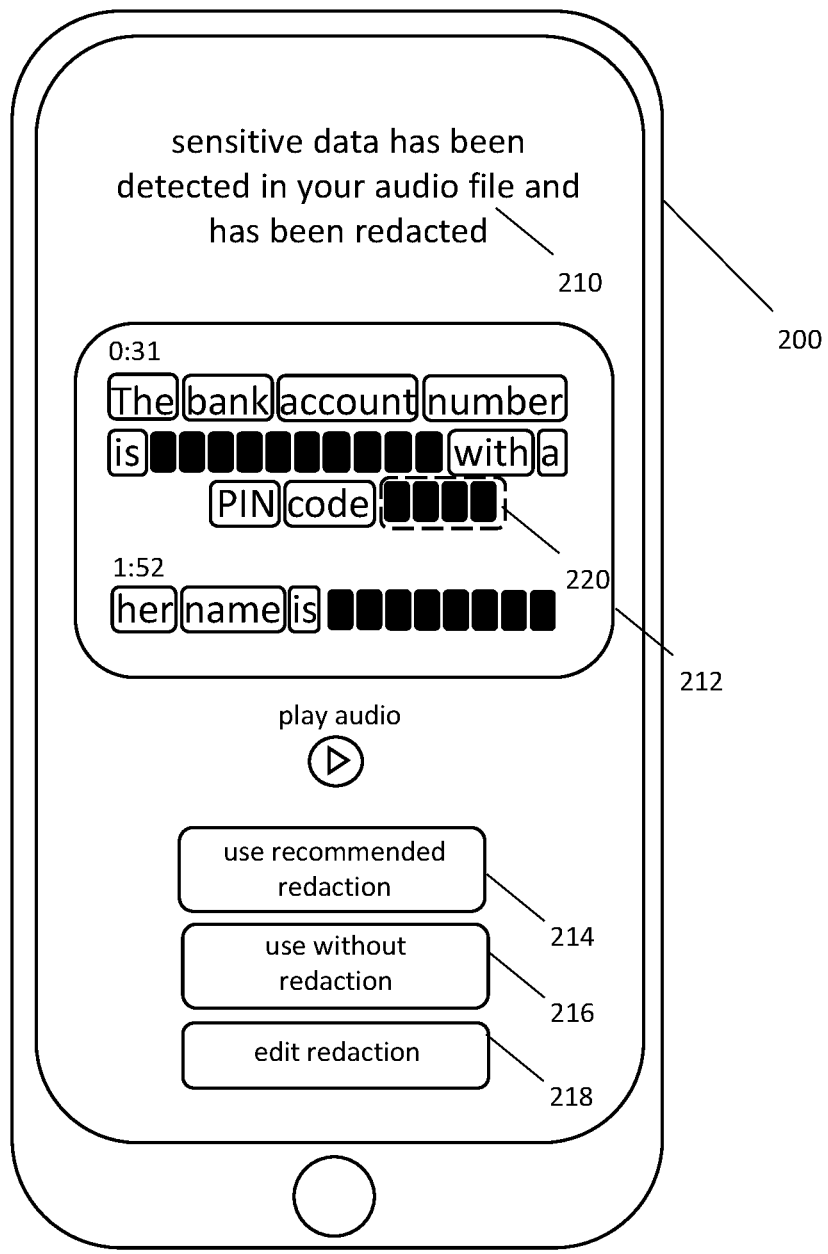
FIG. 2 shows an illustrative diagram of a recommendation provided on a user interface, in accordance with one or more embodiments.

For example, FIG. 2 shows an illustrative diagram of a recommendation provided on a user interface, in accordance with one or more embodiments. The recommendation may be provided on a user interface on display 132 of remote device 130. The remote device 130 may be a user's mobile device, for example. As described herein, the recommendation may be generated and provided in response to determining that the confidence measure corresponds to (e.g., exceeds, meets) a threshold confidence measure. For example, if the multi-modal input is classified to contain sensitive data with a confidence measure that is high enough to exceed the threshold confidence measure, the display may provide a recommendation for obfuscating the sensitive data by obfuscating at least a portion of the multi-modal input (e.g., the portion including the sensitive data) by redacting the portion of the multi-modal input.

In the example of FIG. 2, the display indicates to the user that the multi-modal input was classified to include sensitive data with a message 210 "sensitive data has been detected in your audio file and has been redacted." The portions 212 of the multi-modal data that include sensitive data may be displayed to the user and recommended redaction(s) 220 may be shown to the user via a device 200, e.g., such as remote device 130.

The display may provide to the user one or more different options for actions. For example, the display may provide an option to use the recommended redaction 214, an option to use without redaction 216, and an option to edit the redaction 218, etc. In some examples, rather than redacting based on a user's input (e.g., choice of one of the provided options), the analysis system 110 may automatically perform obfuscation. The analysis system 110 may receive, from the user, an indication to obfuscate the portion of the multi-modal input. For example, the user may interact with the display or system to indicate that the user has selected an option.

According to some embodiments, the type of obfuscation performed may be based, in part on the format of the data included in the multi-modal data. For example, the analysis system 110 may determine that the multi-modal input comprises data of a visual modality and overlay the portion of the data with the visual modality of the multi-modal input with a shape. The obfuscation may include removing at least a portion of metadata associated with the data of the visual modality. Alternatively, or additionally, the analysis system 110 may determine that the multi-modal input comprises data with an auditory modality and replace, with an auditory clip, the portion of the multi-modal input. In some embodiments, the analysis system 110 may determine that the multi-modal input comprises data with a textual modality and replace, with a text string, the portion of the multi-modal input. Once the system obfuscates at least a portion of the multi-modal input by redacting the portion of the multi-modal input, the analysis system 110 may further transmit, to a remote device, the obfuscated output (e.g., for final confirmation, or usage).

According to some embodiments, the output of the preprocessors may include a confidence measure indicative of an accuracy of the single modal data format. For example, the preprocessors may output an accuracy for converting a multi-modal input into a single modal output through the one or more preprocessing functions. For example, the single modal data format may be a textual data format. The preprocessors may perform ASR or OCR as described herein and output both a textual data format of audio or visual data (e.g., as a result of performing ASR and/or OCR) as well as a measure of confidence as to how accurate the ASR and/or OCR may be. For example, the analysis system 110 may determine a data type of the single modal data format, such as textual, auditory, visual, etc. The analysis system 110 may input the data type into a database listing thresholds corresponding to different data types to determine a threshold single modal accuracy measure for the data type. For example, the analysis system 110 may input the "textual"

data type and determine a corresponding threshold. The system may then compare the confidence measure to the threshold single modal accuracy measure and in response to determining that the confidence measure does not correspond to (e.g., does not meet or exceed) the threshold single modal accuracy measure, selecting the second preprocessor.

Aspects of the invention may relate to a module-based method as opposed to end-to-end models. For example, module-based models may be composed of multiple modular components (e.g., preprocessing components such as ASRs, a natural language understanding (NLU) unit) designed and trained separately to perform specific tasks. In contrast, end-to-end models may be designed to perform the entire task in a single model without the need for modular components.

A module-based model may provide multiple advantages over end-to-end models. For example, one key issue in multi-modal processing is the need to balance the computational cost and the confidence level (e.g., whether the input has been processed correctly, accurately, etc.). End-to-end models attempt to solve this problem by providing an early exit option, where the model may output a prediction before final layer(s) of the network are reached. By doing so, end-to-end models can cut down on computational cost while maintaining the desired levels of accuracy. However, one key drawback to such end-to-end models is that this requires complex optimization across the entire network to ensure that the early exits are placed in the optimal locations. This can be especially difficult for multi-modal input processing as the input data is complex. Furthermore, determining the optimal locations for early exits requires a comprehensive search over all exit points in the network. Such search spaces may be expansive (e.g., for deep networks), which makes the training process computationally expensive and time consuming.

Instead, module-based systems, as described in FIG. 1A and FIG. 2, may use different preprocessors of varying levels to balance the computational cost and confidence levels. Furthermore, the system may learn, over time, the optimal preprocessors to use to cut computational cost and maintain desired confidence levels using reinforcement learning and/or online k-means with previous inputs as described herein, rather than having an expensive training process prior to usage of the model.

As another example, while some end-to-end models may incorporate stacked models, end-to-end models are fundamentally distinct from module-based models in that they train all of the components simultaneously (e.g., ASR, NLU, etc.). By contrast, a module-based approach involves the design and optimization of independent modules for each specific task, facilitating development and fine-tuning without impacting other modules. As described earlier, by contrast, optimizing early exits in an end-to-end model can require complex optimization across the entire network to ensure optimal placement.

Thus, a module-based approach can provide greater flexibility, interpretability, and scalability, especially for complex tasks such as processing of multi-modal inputs, given that multi-modal input data is heterogeneous (e.g., where each modality has its own unique representations, structures, features), has modality-specific processing, data imbalance, high-dimensional inputs, etc. For example, end-to-end models are hard to train for an increasingly large number of modalities due to combinatorial explosion, as opposed to module-based models, which are able to train and include different models for different modalities easily.

One example of this can be seen with NLUs. For example, recent NLUs utilize character representations over word representations, which enables higher accuracy in models. With a module-based approach, the system and users are able to control the representation of the data easily and make changes to a model easily due to the flexibility and interpretability of module-based systems. Using an end-to-end system requires a large amount of training, as the individual model cannot be retrained, nor can a user make changes to the intermediate representations created by an end-to-end system.

Figure 1B:
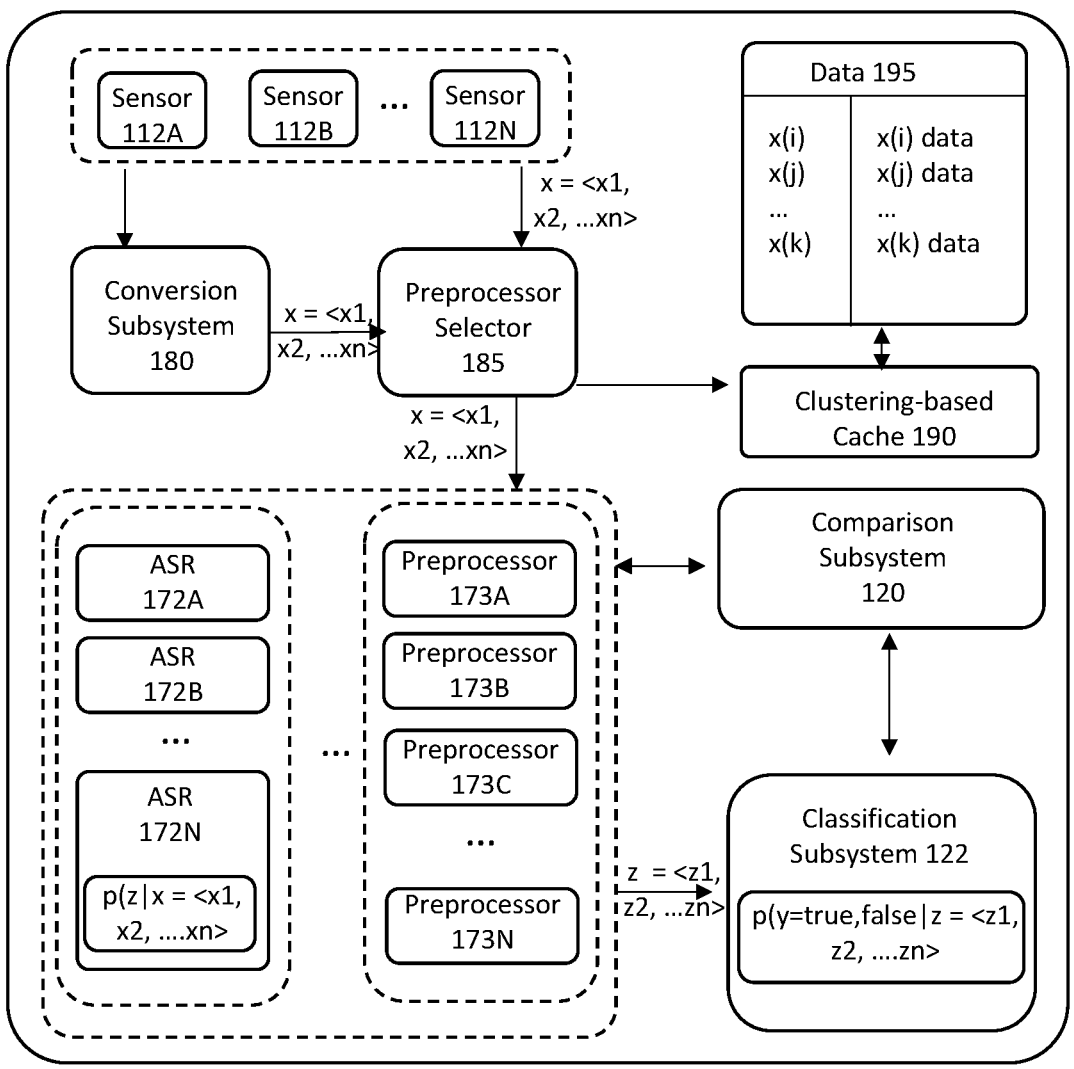
FIG. 1B shows an illustrative diagram of an example analysis system for minimizing the computational cost and/or storage cost of computer resources when analyzing multi-modal data, in accordance with one or more embodiments.

One example of an analysis system of FIG. 1A is shown in more detail in FIG. 1B. FIG. 1B shows an illustrative diagram of an example analysis system 160 for minimizing the computational cost and/or storage cost of computer resources when analyzing multi-modal data, in accordance with one or more embodiments. Analysis system 160 may select the first and/or second preprocessor according to an online k-means model.

As described in reference to FIG. 1A, the analysis system may obtain a new input via the sensors 112A-N, or from a remote device via a network. In some examples, when a raw input is obtained, e.g., using sensors described herein, the input may be converted into one or more different representations by conversion subsystem 180 in order to enable the input to be processed using the preprocessors. Audio signals, for example, are often complex and consist of multiple frequencies and time-varying components, making them difficult to analyze and extract features from their raw time-domain form. In the case of audio signals, conversion subsystem 180 of analysis system 160 may perform Fourier analysis to convert the audio signal into a frequency-domain representation. In other cases, the conversion subsystem may apply unsupervised learning techniques to transform the signal into a suitable representation (e.g., able to be processed by the preprocessors) that captures more meaningful features and relationships among data points.

Once the system obtains a representation of the signal that is able to be processed via the preprocessors (e.g., either by conversion or by receiving a representation from a remote device that is suitable), the system may then find a suitable preprocessor. In the example of FIG. 1B, the signal and/or the representation of the signal is illustrated as a vector x, where x has n elements <x1, x2, . . . xn>. The representation of the signal and/or the signal itself is input into preprocessor selector 185 in order to find a suitable preprocessor for selection. As described herein, the preprocessor selector may use an online k-means model to select a preprocessor.

In some embodiments, the online k-means model used by preprocessor selector 185 and analysis system 160 may include both an inference step and an updating step. In the inference step, as each new input arrives, the new input is compared to the current cluster centers using a similarity or distance metric. The new input may then be assigned to the nearest center, or a center that is within a threshold metric of similarity, and the preprocessor associated with the center may be used to preprocess the input. In the updating step, the input as well as the preprocessor used and metrics obtained associated with the preprocessing of the input are recorded, e.g., in data 195 of clustering-based cache 190. The centers may be updated using the input.

As described herein, when the preprocessor selector 185 receives a new input (e.g., the representation of the signal and/or the signal), the preprocessor selector 185 may select, based on the input, an appropriate preprocessor of multiple preprocessors of the analysis system 160 as described herein. For example, when preprocessor selector 185 receives an audio signal, e.g., in frequency-domain representation, the preprocessor selector may determine which of ASRs 172A-N to transmit the audio signal to, where the ASR preprocessors, also referred to herein as ASRs, each having varying levels of computational expense, accuracy levels, and/or the like. For example, different ASRs may be more advanced, e.g., have more characteristics that enhance its performance or capabilities in handling data. Some of these characteristics may include improved accuracy, enhanced efficiency, adaptability, robustness, scalability, interoperability, etc.

The preprocessor selector 185 may act in combination with the clustering-based cache 190, where the clustering-based cache may have access to data 195 including previous inputs, represented in FIG. 1B as "x(i)," "x(j)," and "x(k)." The clustering-based cache 190 may also have access to data 195 indicating the preprocessors used in preprocessing each of the inputs. In some cases, the cache may store data indicating the preprocessors that yielded the best performance, e.g., as measured by time, accuracy, true positives, false positives, true negatives, false negatives, and/or the like.

The preprocessor selector 185 may first compare the input to centers of the online k-means model using a similarity and/or distance metric, e.g., where each center is representative of an average data point for a cluster. Depending on the representation the input is in, different similarity and/or distance metrics may be used. For example, in the case of feature vector representation, Euclidean distance may be employed, and in other cases, such as frequency-domain representations, Pearson similarity may be used. However, many different feasible representations may be used. The system may select the center with the highest measure of similarity or lowest measure of distance.

In some examples, the similarity metric may include spectrographic cross correlation (SP/CC). Spectrographic cross correlation involves measuring frequency distortion of signals as a similarity metric. For example, when a new input is received, the input signal may be transformed into the frequency domain using spectrogram analysis. Cross-correlation may be performed between a spectrogram corresponding to the new input signal and spectrograms corresponding to previous input signals. Alternatively or additionally, the similarity metric may include dynamic time warping (DTW). Dynamic Time Warping includes finding optimal alignments between two sequences (e.g., a sequence corresponding to a new input signal and a sequence corresponding to previous input signals) by warping the time axis.

In certain scenarios, a system may not select a center if a threshold level of closeness is not met. This can occur when the distance between the input data point and the cluster center exceeds a predefined threshold or when the similarity measure does not exceed a threshold value. In such cases, the system may choose, rather than a preprocessor associated with the cluster, an alternative preprocessor. For example, the system may opt to use the most advanced preprocessor available, which can provide better results when dealing with data points that do not fit well within the existing clusters. In other cases, the system may not use a preprocessor at all if the threshold level of closeness is not met. For example, the system may instead opt to transmit the signal out to a remote device and prompt for a user to classify the signal (e.g., as containing sensitive data or not).

The system may take into account additional parameters before selecting a cluster. For example, the system may consider the average or median accuracy of the cluster, the average or median time spent preprocessing in the cluster, and/or the like, as recorded in the clustering-based cache 190. If the system evaluates these parameters and finds them to be within the threshold parameters, the system may then select the cluster and preprocess the input and/or the representation of the input using the representative preprocessor of the cluster. The representative preprocessor of the cluster may be the preprocessor used most often in the cluster, for example.

In some cases, the system may additionally use hierarchical clustering. For example, after selecting a first cluster from a first layer of clusters for incoming inputs (e.g., x), the system may then select from a second layer of clusters (e.g., subclusters) within the first cluster. The second layer of clusters within the first cluster may be clustered based on same or similar preprocessors used. For example, there may be three subclusters within the selected cluster for each preprocessor used for inputs in the selected cluster. The subcluster may be selected based on a similarity metric as described herein.

During the updating step, the system may preprocess the input and/or representation of the input using the representative preprocessor of the selected cluster and may record the input and/or the representation of the input, the preprocessor used, and one or more measurements of the processing performed, such as time spent, accuracy, true negative, true positive, false negative, false positive likelihoods, etc. in the data 195 of clustering-based cache 190. The centers may be updated by computing new weighted averages of the current center position. The clustering-based cache 190 may include the new input and recorded data as well as the new center positions.

As described herein, if the cluster is selected, and the representative preprocessor of the cluster is determined, the preprocessor selector may transmit the signal to the representative preprocessor (e.g., the preprocessor used most in the selected cluster). For example, the preprocessor selector 185 may select the preprocessor ASR (e.g., ASR 172N), which may be represented as $p(z|x=<x_1, x_2, \ldots x_n>)$. In this example, z may represent an intermediate output, such as text, that is derived using the input x. The generated intermediate output may subsequently be transmitted to classification subsystem 122, such as an NLU, which may be represented as $p(y=true, false|z=<z_1, z_2, \ldots z_n>)$, where y is an output having values true for when an input is determined to have sensitive data and false for when an input is determined to not have sensitive data.

As described herein, Bayesian inference may include summing over all possible word sequences z (e.g., output z from the preprocessors) which may be combinatorial. In some cases, this may be computationally infeasible given the number of words, e.g., as the sequence length increases. To overcome this issue, approximation techniques such as beam search or Markov Chain Monte Carlo (MCMC) sampling may be used instead.

According to some embodiments, when a probability of a false negative is high, e.g., if a probability of an input being classified as not including sensitive data given a specific input and a specific preprocessor (e.g., input x and ASR 172N) exceeds a threshold, the system may both use Bayesian inference and also accelerate the preprocessor pipeline by choosing a preprocessor that is more computationally expensive than the next preprocessor that would typically be chosen.

Figure 3:
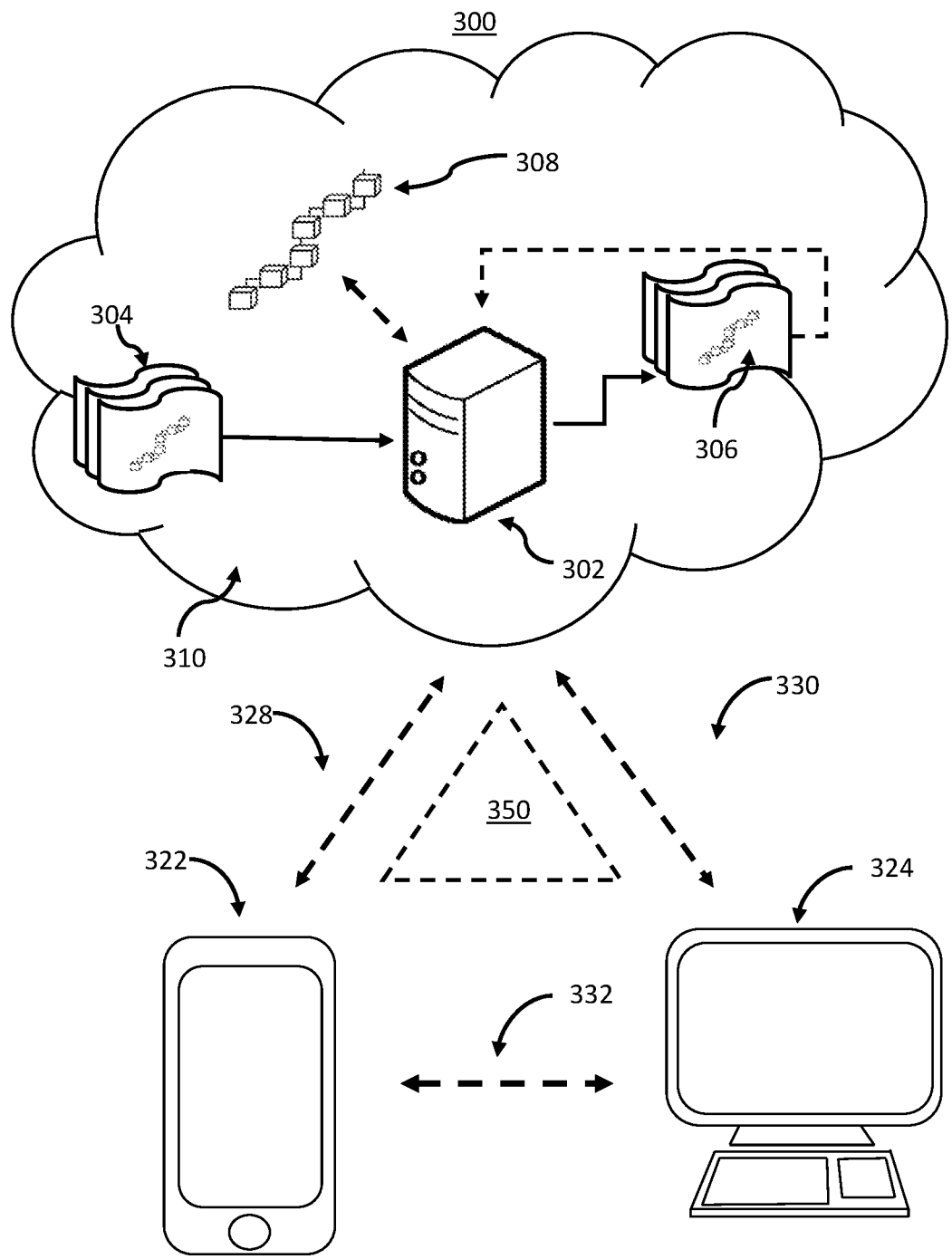
FIG. 3 shows illustrative components for a system used to minimize the computational cost and/or storage cost of computer resources when analyzing multi-modal data, in accordance with one or more embodiments.

FIG. 3 shows illustrative components for a system used to minimize the computational cost and/or storage cost of preprocessors when analyzing multi-modal data in real-time, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include analysis system 110, remote device 130, remote server 140, and/or network 150. Cloud components 310 may include model 302, which may be a machine learning model, AI model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train the model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., sensitive, non-sensitive information). The model 302 may also output a confidence measure for the classification.

In some embodiments, the model (e.g., model 302) may automatically perform actions based on outputs 306. In some embodiments, the model (e.g., model 302) may not perform any actions. The output of the model (e.g., model 302) may be used minimize the computational cost and/or storage cost of preprocessors when analyzing multi-modal data in real-time.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front end and back end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
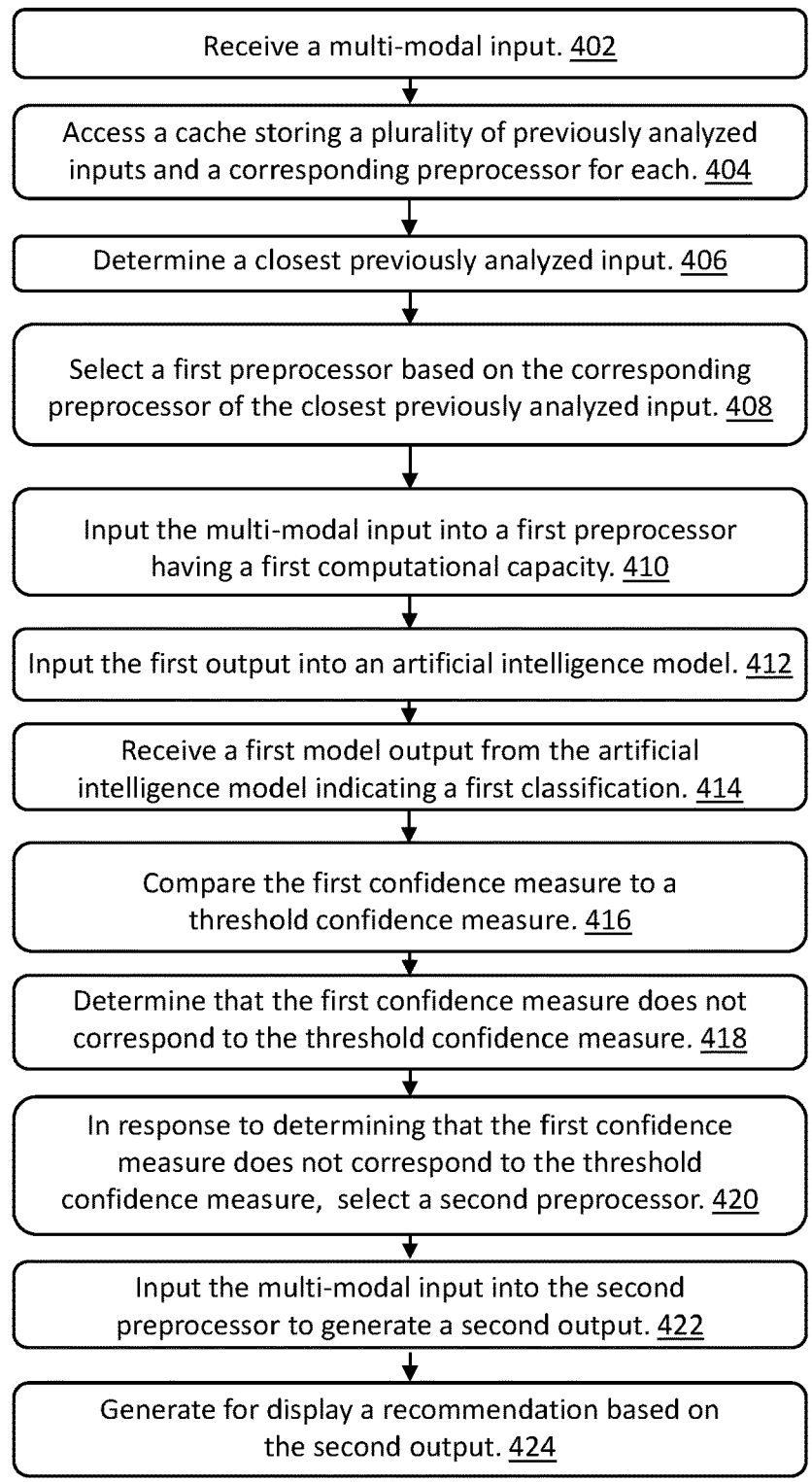
FIG. 4 shows a flowchart of the steps involved in minimizing the computational cost and/or storage cost of computer resources when analyzing multi-modal data, in accordance with one or more embodiments.

FIG. 4 shows a flowchart of the steps involved in for minimizing the computational cost and/or storage cost of preprocessors when analyzing multi-modal data in real-time, in accordance with one or more embodiments. For example, the system may use process 400 (e.g., as implemented on one or more system components described above) in order to triage preprocessors that perform the multi-modal data analysis and provide conservation of computational cost, e.g., for use only in instances where the multi-modal data analysis is particularly difficult or complex.

At step 402, process 400 (e.g., using one or more components described above) includes receiving a multi-modal input. For example, the system may receive a multi-modal input using one or more sensors, wherein the multi-modal input comprises a multi-modal data format. For example, sensors such as imaging sensors, microphones, etc. may be used to obtain a multi-modal input which includes multiple types of input or data having different formats, such as text and images.

At step 404, process 400 (e.g., using one or more components described above) includes accessing a cache storing a plurality of previously analyzed inputs and a corresponding preprocessor for each. For example, the system may access a cache storing a plurality of previously analyzed inputs and a corresponding preprocessor for each previously analyzed input.

At step 406, process 400 (e.g., using one or more components described above) includes determining a closest previously analyzed input. For example, the system may determine, based on a similarity metric, a closest previously analyzed input having values closest to values of the multi-modal input. According to some embodiments, the system may further include calculating the similarity metric by measuring spectrographic cross correlation, dynamic time warping and/or embedding distance as described herein.

In some examples, the cache may be a clustering-based cache (e.g., clustering-based cache 190), where the clustering-based cache may have access to previous inputs, the preprocessors used in preprocessing each of the previous inputs. In some cases, the cache may additionally store data indicating the preprocessors that yielded the best performance, e.g., as measured by time (e.g., time the processors took to classify the input, historic inference time), accuracy, rate of occurrences of true positive, false positive, true negative, false negative, and/or the like.

At step 408, process 400 (e.g., using one or more components described above) includes selecting a first preprocessor based on the corresponding preprocessor of the closest previously analyzed input. For example, the system may select a first preprocessor based on the corresponding preprocessor of the closest previously analyzed input. According to some embodiments, selecting the first preprocessor based on the corresponding preprocessor of the closest previously analyzed input includes determining if performance values of the corresponding preprocessor match one or more criteria, wherein the performance values comprise historic inference time of the corresponding preprocessor and/or historic true positive, false positive, true negative and/or false negative classification rates of the corresponding preprocessor.

According to some examples, the system may take into account additional parameters before selecting a processor. For example, the system may consider the average or median accuracy of the closest previously analyzed input. In the case of a cluster-based cache, the system may consider the average or median accuracy of the cluster to which the closest previously analyzed input belongs, the average or median time spent preprocessing in the cluster, and/or the like, as recorded in the clustering-based cache.

At step 410, process 400 (e.g., using one or more components described above) includes inputting the multi-modal input into the first preprocessor, e.g., having a first computational cost. For example, the system may input the multi-modal input into a first preprocessor to generate a first output, wherein the first output comprises a single modal data format, and wherein the first preprocessor has a first computational cost. For example, the system may input a multi-modal input having auditory and visual modalities of data into a first preprocessor, which may perform preprocessing functions for auditory and visual data. The preprocessor may perform ASR and OCR to convert the multi-modal input into a single modal data format, e.g., textual data. By doing so, the system may be able to input the single modal data output into a model trained on a single format of data, thereby conserving computational resources that would otherwise be spent on training and applying separate models for each of the different modalities of data.

In some embodiments, the system may determine a modality included in the multi-modal input and in response to determining that the multi-modal input includes data of a modality, the system may select a preprocessor configured to perform preprocessing functions for that modality. For example, in response to determining that the multi-modal input comprises data with the auditory modality, the analysis system 110 may select a preprocessor based on the preprocessor being configured to perform ASR. As another example, the analysis system 110 may, in response to determining that the multi-modal input comprises data with the visual modality, select a preprocessor based on the preprocessor being configured to perform OCR. Alternatively, or additionally, the analysis system 110 may, in response to determining that the multi-modal input comprises data with textual modality, select a preprocessor based on the preprocessor being configured to perform preprocessing functions for textual data, e.g., at least one of tokenization, lowercasing, stemming or lemmatization.

At step 412, process 400 (e.g., using one or more components described above) includes inputting the first output into an AI model. For example, the system may input the first output into an AI model, wherein the AI model is trained to determine classifications of inputted data and determine confidence measures for each respective classification. At step 414, process 400 (e.g., using one or more components described above) includes receiving a first model output from the AI model indicating a first classification. For example, the system may receive a first model output from the AI model, wherein the first model output indicates a first classification for the first model output and a first confidence measure for the first classification. For example, the system may input the single modal output (e.g., textual data) into the AI model. The AI model may be trained to determine classifications of the single modal data, such as whether or not the single modal data and/or multi-modal data includes sensitive data. The AI model may also be trained to determine a confidence measure for the classification, such as a percentage indicating a likelihood and/or probability that the AI model has classified the data correctly. The AI model may output a classification indicating portions of the data that includes sensitive data, as well as a confidence measure.

At step 416, process 400 (e.g., using one or more components described above) includes comparing the first confidence measure to a threshold confidence measure. At step 418, process 400 (e.g., using one or more components described above) includes determining that the first confidence measure does not correspond to the threshold confidence measure.

At step 420, process 400 (e.g., using one or more components described above) includes, in response to determining that the first confidence measure does not correspond to (e.g., does not meet or exceed) the threshold confidence measure, selecting a second preprocessor. For example, the system may, in response to determining that the first confidence measure does not correspond to the threshold confidence measure, select a second preprocessor from a plurality of preprocessors based on the second preprocessor having a greater computational cost than the first preprocessor. For example, if the confidence measure is less than a threshold confidence measure, indicating that the probability that the classification is accurate is less than a threshold (e.g., a user set threshold), the system may select a second preprocessor, e.g., having a greater computational cost. By doing so, the system is able to conserve computational cost by only performing preprocessing using a lower computational cost preprocessor unless the confidence measure shows that the classification is likely to be inaccurate.

Alternatively, or additionally, the system may select the second preprocessor based on other characteristics or parameters. In some embodiments, selecting the second preprocessor from the plurality of preprocessors includes determining a respective memory cost for each preprocessor of the plurality of preprocessors and selecting the second preprocessor based on its respective memory cost.

At step 422, process 400 (e.g., using one or more components described above) includes inputting the multi-modal input into the second preprocessor to generate a second output. For example, the system may input the multi-modal input into the second preprocessor to generate a second output, wherein the second output comprises the single modal data format.

At step 424, process 400 (e.g., using one or more components described above) includes generating for display a recommendation based on the second output. For example, the system may generate for display, on a user interface, a recommendation based on the second output. The recommendation can include, for example, the second output and a recommendation to input the second output into the AI model.

In some embodiments, the process may further include inputting the second output into the artificial intelligence model, receiving a second model output from the AI model, wherein the second model output indicates a second classification for the multi-modal input and a second confidence measure for the second classification, comparing the second confidence measure to the threshold confidence measure, determining that the second confidence measure corresponds to the threshold confidence measure, and in response to determining that the second confidence measure corresponds to the threshold confidence measure, determining to generate the recommendation for display.

The recommendation may include obfuscating at least a portion of the multi-modal input by redacting the portion of the multi-modal input. For example, the system may determine, based on the recommendation, to obfuscate at least a portion of the multi-modal input. In response to determining to obfuscate at least a portion of the multi-modal input, the system may determine a portion of the multi-modal input indicated by the second model output as having the second classification. The system may obfuscate at least a portion of the multi-modal input by redacting the portion of the multi-modal input to obtain an obfuscated output and transmit, to a remote device, the obfuscated output.

According to some embodiments, the system may generate for display, via the user interface to a user, the recommendation for obfuscating at least a portion of the multi-modal input by redacting the portion of the multi-modal input and receiving, from the user, an indication to obfuscate the portion of the multi-modal input.

According to some embodiments, the type of obfuscation performed may be based, in part, by the format of the data included in the multi-modal data. For example, the system may determine that the multi-modal input comprises data of a visual modality and overlay the portion of the data with the visual modality of the multi-modal input with a shape. The obfuscation may include removing at least a portion of metadata associated with the data of the visual modality. Alternatively, or additionally, the system may determine that the multi-modal input comprises data with an auditory modality and replace, with an auditory clip, the portion of the multi-modal input. In some embodiments, the system may determine that the multi-modal input comprises data with a textual modality and replace, with a text string, the portion of the multi-modal input. Once the system obfuscates at least a portion of the multi-modal input by redacting the portion of the multi-modal input, the system may further transmit, to a remote device, the obfuscated output (e.g., for final confirmation, or usage).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method, the method comprising receiving a multi-modal input using one or more sensors, wherein the multi-modal input comprises a multi-modal data format; accessing a cache storing a plurality of previously analyzed inputs and a corresponding preprocessor for each previously analyzed input; determining, based on a similarity metric, a closest previously analyzed input having values closest to values of the multi-modal input; selecting a first preprocessor based on the corresponding preprocessor of the closest previously analyzed input; inputting the multi-modal input into the first preprocessor to generate a first output, wherein the first output comprises a single modal data format, and wherein the first preprocessor has a first computational cost; inputting the first output into an artificial intelligence model, wherein the artificial intelligence model is trained to determine classifications of inputted data and determine confidence measures for each respective classification; receiving a first model output from the artificial intelligence model, wherein the first model output indicates a first classification for the first model output and a first confidence measure for the first classification; comparing the first confidence measure to a threshold confidence measure; determining that the first confidence measure does not correspond to the threshold confidence measure; in response to determining that the first confidence measure does not correspond to the threshold confidence measure, selecting a second preprocessor from a plurality of preprocessors based on the second preprocessor having a greater computational cost than the first preprocessor; inputting the multi-modal input into the second preprocessor to generate a second output, wherein the second output comprises the single modal data format; and generating for display, on a user interface, a recommendation based on the second output.

2. The method of any one of the preceding embodiments, further comprising: inputting the second output into the artificial intelligence model; receiving a second model output from the artificial intelligence model, wherein the second model output indicates a second classification for the multi-modal input and a second confidence measure for the second classification; comparing the second confidence measure to the threshold confidence measure; determining that the second confidence measure corresponds to the threshold confidence measure; and in response to determining that the second confidence measure corresponds to the threshold confidence measure, determining to generate the recommendation for display.

3. The method of any one of the preceding embodiments, wherein the recommendation comprises obfuscating at least a portion of the multi-modal input by redacting the portion of the multi-modal input and wherein the method further comprises: determining, based on the recommendation, to obfuscate at least the portion of the multi-modal input; in response to determining to obfuscate at least a portion of the multi-modal input, determining a portion of the multi-modal input indicated by the second model output as having the second classification; obfuscating at least a portion of the multi-modal input by redacting the portion of the multi-modal input to obtain an obfuscated output; and transmitting, to a remote device, the obfuscated output.

4. The method of any one of the preceding embodiments, wherein determining, based on the recommendation, to obfuscate at least a portion of the multi-modal input comprises: generating for display, via the user interface to a user, the recommendation for obfuscating at least a portion of the multi-modal input by redacting the portion of the multi-modal input; and receiving, from the user, an indication to obfuscate the portion of the multi-modal input.

5. The method of any one of the preceding embodiments, wherein redacting the portion of the multi-modal input comprises: determining that the multi-modal input comprises data of a visual modality; overlaying the portion of the data with the visual modality of the multi-modal input with a shape; and removing at least a portion of metadata associated with the data of the visual modality.

6. The method of any one of the preceding embodiments, wherein redacting the portion of the multi-modal input comprises: determining that the multi-modal input comprises data with an auditory modality; and replacing, with an auditory clip, the portion of the multi-modal input.

7. The method of any one of the preceding embodiments, wherein redacting the portion of the multi-modal input comprises: determining that the multi-modal input comprises data with a textual modality; and replacing, with a text string, the portion of the multi-modal input.

8. The method of any one of the preceding embodiments, wherein inputting the multi-modal input into the first preprocessor to generate the first output further comprises: determining that the multi-modal input comprises data with an auditory modality; and in response to determining that the multi-modal input comprises data with the auditory modality, selecting the first preprocessor, from the plurality of preprocessors, based on the first preprocessor being configured to perform automatic speech recognition (ASR).

9. The method of any one of the preceding embodiments, wherein inputting the multi-modal input into the first preprocessor to generate the first output further comprises: determining that the multi-modal input comprises data with a visual modality; and in response to determining that the multi-modal input comprises data with the visual modality, selecting the first preprocessor, from the plurality of preprocessors, based on the first preprocessor being configured to perform optical character recognition (OCR).

10. The method of any one of the preceding embodiments, wherein inputting the multi-modal input into the first preprocessor to generate the first output further comprises: determining that the multi-modal input comprises data with a textual modality; and in response to determining that the multi-modal input comprises data with the textual modality, selecting the first preprocessor, from the plurality of preprocessors, based on the first preprocessor being configured to perform at least one of tokenization, lowercasing, stemming or lemmatization.

11. The method of any one of the preceding embodiments, wherein the first output further comprises a third confidence measure indicative of an accuracy of the single modal data format, and wherein the method further comprises: determining a data type of the single modal data format; inputting the data type into a database listing thresholds corresponding to different data types to determine a threshold single modal accuracy measure for the data type; comparing the third confidence measure to the threshold single modal accuracy measure; and in response to determining that the third confidence measure does not correspond to the threshold single modal accuracy measure, selecting the second preprocessor.

12. The method of any one of the preceding embodiments, wherein selecting the second preprocessor from the plurality of preprocessors further comprises: determining a respective memory cost for each preprocessor of the plurality of preprocessors; and selecting the second preprocessor based on its respective memory cost.

13. The method of any one of the preceding embodiments, wherein selecting the first preprocessor based on the corresponding preprocessor of the closest previously analyzed input comprises: determining if performance values of the corresponding preprocessor match one or more criteria, wherein the performance values comprise historic inference time of the corresponding preprocessor and/or historic true positive, false positive, true negative and/or false negative classification rates of the corresponding preprocessor.

14. The method of any one of the preceding embodiments, further comprising calculating the similarity metric by measuring spectrographic cross correlation, dynamic time warping and/or embedding distance.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory-storing instructions that, when executed by the processors, cause the processors to effectuate operations comprising those of any of embodiments 1-14.

17. A system comprising means for performing any of embodiments 1-14.

What is claimed is:

1. A system for minimizing computational cost of preprocessors in mobile devices when analyzing multi-modal data for sensitive data in real-time, the system comprising:
a mobile device comprising one or more processors and non-transitory computer-readable media comprising instructions that, when executed by the one or more processors, cause operations comprising:
receiving a multi-modal input using one or more sensors, wherein the multi-modal input comprises a multi-modal data format;
accessing a cache storing a plurality of previously analyzed inputs and a corresponding preprocessor for each previously analyzed input;
determining, based on a similarity metric, a closest previously analyzed input having first values closest to second values of the multi-modal input;
selecting a first preprocessor based on the corresponding preprocessor of the closest previously analyzed input;
inputting the multi-modal input into the first preprocessor to generate a first output, wherein the first output comprises a single modal data format, and wherein the first preprocessor has a first computational cost;
inputting the first output into an artificial intelligence model, wherein the artificial intelligence model is trained to determine classifications of inputted data and determine confidence measures for each respective classification;
receiving a first model output from the artificial intelligence model, wherein the first model output indicates a first classification for the first model output and a first confidence measure for the first classification;
comparing the first confidence measure to a threshold confidence measure;

determining that the first confidence measure does not correspond to the threshold confidence measure;

in response to determining that the first confidence measure does not correspond to the threshold confidence measure, selecting a second preprocessor from a plurality of preprocessors based on the second preprocessor having a greater computational cost than the first preprocessor;

inputting the multi-modal input into the second preprocessor to generate a second output, wherein the second output comprises the single modal data format;

inputting the second output into the artificial intelligence model;

receiving a second model output from the artificial intelligence model, wherein the second model output indicates a second classification for the multi-modal input and a second confidence measure for the second classification;

comparing the second confidence measure to the threshold confidence measure;

determining that the second confidence measure corresponds to the threshold confidence measure; and generating for display, on a user interface, a recommendation based on the second output, wherein the recommendation comprises obfuscating at least a portion of the multi-modal input by redacting the portion of the multi-modal input.

2. A method for minimizing computational cost of preprocessors when analyzing multi-modal data in real-time, the method comprising:

receiving a multi-modal input using one or more sensors, wherein the multi-modal input comprises a multi-modal data format;

accessing a cache storing a plurality of previously analyzed inputs and a corresponding preprocessor for each previously analyzed input;

determining, based on a similarity metric, a closest previously analyzed input having first values closest to second values of the multi-modal input;

selecting a first preprocessor based on the corresponding preprocessor of the closest previously analyzed input;

inputting the multi-modal input into the first preprocessor to generate a first output, wherein the first output comprises a single modal data format, and wherein the first preprocessor has a first computational cost;

inputting the first output into an artificial intelligence model, wherein the artificial intelligence model is trained to determine classifications of inputted data and determine confidence measures for each respective classification;

receiving a first model output from the artificial intelligence model, wherein the first model output indicates a first classification for the first model output and a first confidence measure for the first classification;

comparing the first confidence measure to a threshold confidence measure;

determining that the first confidence measure does not correspond to the threshold confidence measure;

in response to determining that the first confidence measure does not correspond to the threshold confidence measure, selecting a second preprocessor from a plurality of preprocessors based on the second preprocessor having a greater computational cost than the first preprocessor;

inputting the multi-modal input into the second preprocessor to generate a second output, wherein the second output comprises the single modal data format; and generating for display, on a user interface, a recommendation based on the second output.

3. The method of claim 2, further comprising:

inputting the second output into the artificial intelligence model;

receiving a second model output from the artificial intelligence model, wherein the second model output indicates a second classification for the multi-modal input and a second confidence measure for the second classification;

comparing the second confidence measure to the threshold confidence measure;

determining that the second confidence measure corresponds to the threshold confidence measure; and in response to determining that the second confidence measure corresponds to the threshold confidence measure, determining to generate the recommendation for display.

4. The method of claim 3, wherein the recommendation comprises obfuscating at least a portion of the multi-modal input by redacting the portion of the multi-modal input and wherein the method further comprises:

determining, based on the recommendation, to obfuscate at least the portion of the multi-modal input;

in response to determining to obfuscate at least the portion of the multi-modal input, determining the portion of the multi-modal input indicated by the second model output as having the second classification;

obfuscating at least the portion of the multi-modal input by redacting the portion of the multi-modal input to obtain an obfuscated output; and transmitting, to a remote device, the obfuscated output.

5. The method of claim 4, wherein determining, based on the recommendation, to obfuscate at least the portion of the multi-modal input comprises:

generating for display, via the user interface to a user, the recommendation for obfuscating at least the portion of the multi-modal input by redacting the portion of the multi-modal input; and receiving, from the user, an indication to obfuscate the portion of the multi-modal input.

6. The method of claim 4, wherein redacting the portion of the multi-modal input comprises:

determining that the multi-modal input comprises data of a visual modality;

overlaying the portion of the data with the visual modality of the multi-modal input with a shape; and removing at least a portion of metadata associated with the data of the visual modality.

7. The method of claim 4, wherein redacting the portion of the multi-modal input comprises:

determining that the multi-modal input comprises data with an auditory modality; and replacing, with an auditory clip, the portion of the multi-modal input.

8. The method of claim 4, wherein redacting the portion of the multi-modal input comprises:

determining that the multi-modal input comprises data with a textual modality; and replacing, with a text string, the portion of the multi-modal input.

9. The method of claim 3, wherein selecting the second preprocessor from the plurality of preprocessors further comprises:

determining a respective memory cost for each preprocessor of the plurality of preprocessors; and selecting the second preprocessor based on its respective memory cost.

10. The method of claim 2, wherein inputting the multi-modal input into the first preprocessor to generate the first output further comprises:

determining that the multi-modal input comprises data with an auditory modality; and in response to determining that the multi-modal input comprises the data with the auditory modality, selecting the first preprocessor, from the plurality of preprocessors, based on the first preprocessor being configured to perform automatic speech recognition (ASR).

11. The method of claim 2, wherein inputting the multi-modal input into the first preprocessor to generate the first output further comprises:

determining that the multi-modal input comprises data with a visual modality; and in response to determining that the multi-modal input comprises the data with the visual modality, selecting the first preprocessor, from the plurality of preprocessors, based on the first preprocessor being configured to perform optical character recognition (OCR).

12. The method of claim 2, wherein inputting the multi-modal input into the first preprocessor to generate the first output further comprises:

determining that the multi-modal input comprises data with a textual modality; and in response to determining that the multi-modal input comprises the data with the textual modality, selecting the first preprocessor, from the plurality of preprocessors, based on the first preprocessor being configured to perform at least one of tokenization, lowercasing, stemming or lemmatization.

13. The method of claim 2, wherein the first output further comprises a third confidence measure indicative of an accuracy of the single modal data format, and wherein the method further comprises:

determining a data type of the single modal data format;

inputting the data type into a database listing thresholds corresponding to different data types to determine a threshold single modal accuracy measure for the data type;

comparing the third confidence measure to the threshold single modal accuracy measure; and in response to determining that the third confidence measure does not correspond to the threshold single modal accuracy measure, selecting the second preprocessor, wherein it is determined that the third confidence measure does not correspond to the threshold single modal accuracy measure.

14. The method of claim 2, wherein selecting the first preprocessor based on the corresponding preprocessor of the closest previously analyzed input comprises:

determining that performance values of the corresponding preprocessor match one or more criteria, wherein the performance values comprise historic inference time of the corresponding preprocessor and/or historic true positive, false positive, true negative and/or false negative classification rates of the corresponding preprocessor, wherein it is determined that performance values of the corresponding preprocessor match the one or more criteria.

15. The method of claim 2, further comprising calculating the similarity metric by measuring spectrographic cross correlation, dynamic time warping and/or embedding distance.

16. A One or more non-transitory computer-readable media for detecting sensitive information from multi-modal inputs, comprising instructions that, when executed by one or more processors, cause the one or more processors to perform operations comprising:

receiving a multi-modal input using one or more sensors, wherein the multi-modal input comprises a multi-modal data format;

accessing a cache storing a plurality of previously analyzed inputs and a corresponding preprocessor for each previously analyzed input;

determining, based on a similarity metric, a closest previously analyzed input having first values closest to second values of the multi-modal input;

selecting a first preprocessor based on the corresponding preprocessor of the closest previously analyzed input;

inputting the multi-modal input into the first preprocessor to generate a first output, wherein the first output comprises a single modal data format, and wherein the first preprocessor has a first computational cost;

inputting the first output into an artificial intelligence model, wherein the artificial intelligence model is trained to determine classifications of inputted data and determine confidence measures for each respective classification to obtain a first model output, wherein the first model output indicates a first classification for the first model output and a first confidence measure for the first classification;

in response to determining that the first confidence measure does not correspond to a threshold confidence measure, selecting a second preprocessor having a greater computational cost than the first preprocessor from a plurality of preprocessors;

inputting the multi-modal input into the second preprocessor to generate a second output, wherein the second output comprises the single modal data format; and generating for display, on a user interface, a recommendation based on the second output.

17. The one or more non-transitory computer-readable media of claim 16, wherein the instructions that, when executed by the one or more processors, cause the one or more processors to perform operations further comprising:

inputting the second output into the artificial intelligence model;

receiving a second model output from the artificial intelligence model, wherein the second model output indicates a second classification for the multi-modal input and a second confidence measure for the second classification;

comparing the second confidence measure to the threshold confidence measure;

determining that the second confidence measure corresponds to the threshold confidence measure; and in response to determining that the second confidence measure corresponds to the threshold confidence measure, determining to generate for display the recommendation.

18. The one or more non-transitory computer-readable media of claim 16, wherein inputting the multi-modal input into the first preprocessor to generate the first output further comprises:

determining that the multi-modal input comprises data with a textual modality; and in response to determining that the multi-modal input comprises the data with the textual modality, selecting the first preprocessor, from the plurality of preprocessors, based on the first preprocessor being configured to perform at least one of tokenization, lowercasing, stemming, or lemmatization.

19. The one or more non-transitory computer-readable media of claim 17, wherein the instructions that, when executed by the one or more processors, cause the one or more processors to perform operations further comprising:
in response to determining that the second confidence measure corresponds to the threshold confidence measure, determining a portion of the multi-modal input indicated by the second model output as having the second classification; and
obfuscating at least the portion of the multi-modal input by redacting the portion of the multi-modal input to obtain an obfuscated output.

20. The one or more non-transitory computer-readable media of claim 16, wherein inputting the multi-modal input into the first preprocessor to generate the first output further comprises:
determining that the multi-modal input comprises data with an auditory modality; and
in response to determining that the multi-modal input comprises the data with the auditory modality, selecting the first preprocessor, from the plurality of preprocessors, based on the first preprocessor being configured to perform automatic speech recognition (ASR).

21. The one or more non-transitory computer-readable media of claim 16, wherein inputting the multi-modal input into the first preprocessor to generate the first output further comprises:
determining that the multi-modal input comprises data with a visual modality; and
in response to determining that the multi-modal input comprises the data with the visual modality, selecting the first preprocessor, from the plurality of preprocessors, based on the first preprocessor being configured to perform optical character recognition (OCR).

* * * * *